Figure 1:
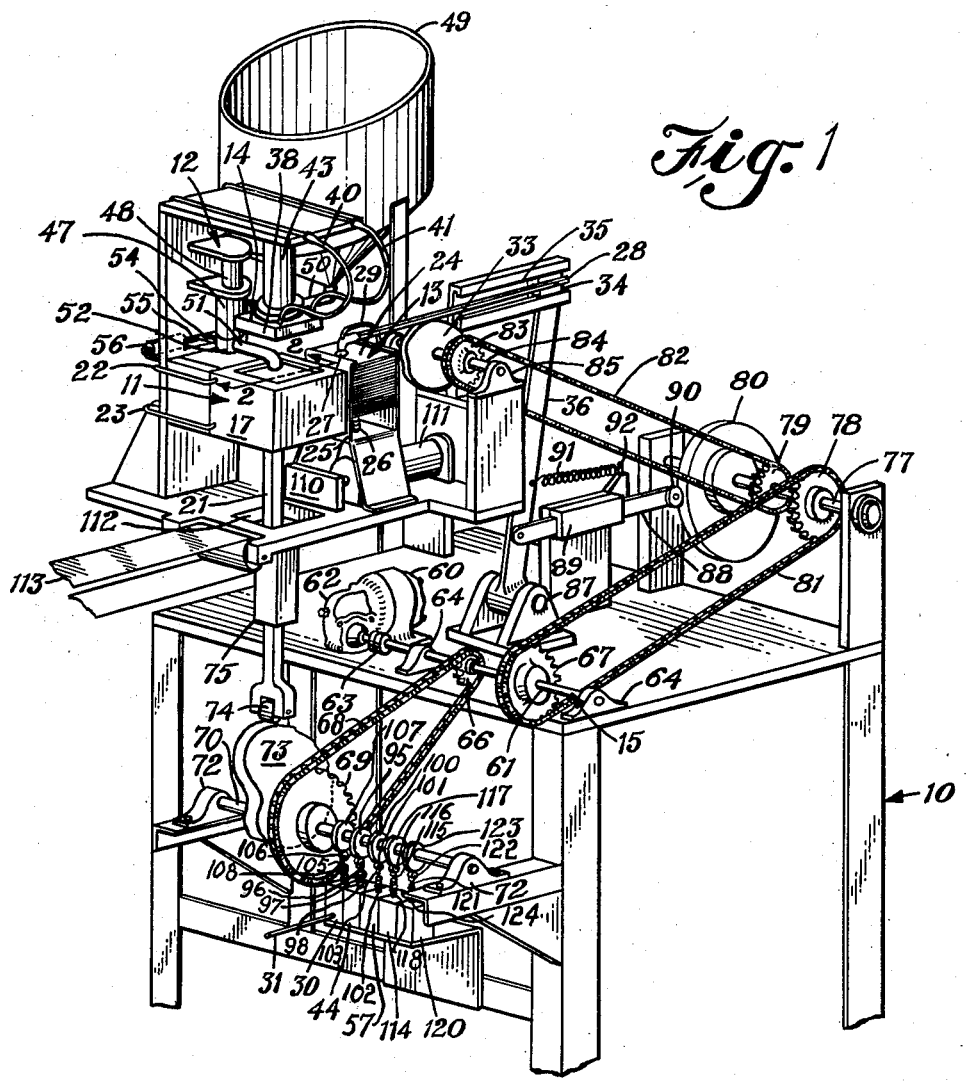

Aug. 11, 1959  B. T. HENSGEN ET AL  2,899,317
METHOD AND APPARATUS FOR PREPARING SLABS OF FOOD PRODUCT
Filed Aug. 9, 1954

BERNARD T. HENSGEN
CLIFFORD E. EVANSON
INVENTORS

BY R. T. Story

ATTORNEY

United States Patent Office 2,899,317
Patented Aug. 11, 1959

2,899,317

METHOD AND APPARATUS FOR PREPARING SLABS OF FOOD PRODUCT

Bernard T. Hensgen and Clifford E. Evanson, Chicago, Ill., assignors to Swift & Company, Chicago, Ill., a corporation of Illinois Application August 9, 1954, Serial No. 448,612

10 Claims. (Cl. 99—178)

The present invention relates to a method and apparatus for preparing slabs of food products, such as processed cheese or the like.

Products such as cheese that are often used in a slab form have a much greater public acceptance in the stores if they are sold in that slab form rather than in a block from which the purchasers must cut a slab. This is not only because the purchaser is saved the work of cutting the slice from the block, but also because the purchaser has considerable difficulty in cutting one or more slices that are uniform in thickness. Unfortunately, however, sliced cheese coheres, particularly upon standing for a period of time, so that it often seems as though it never had once been separated into slab form. Upon attempting to separate the slabs where this condition has occurred, the slabs often will tear and break.

Several proposals have been made to produce slices of cheese or process cheese without this problem occurring, and at least two are presently in commercial use. One of these is to provide a slick or glazed surface on the slice to eliminate or reduce the tendency of the cheese to cohere, and the other is to divide a block of cheese into a plurality of slabs and to wind a ribbon of parting material through the slabs so produced. While both of these are being successfully employed today, one disadvantage has been encountered that increases the cost of manufacture of the products over what theoretically should be obtained. This is the problem of "rework."

In the process cheese industry, the term "rework" is applied to the processed cheese product that cannot be used as initially prepared and yet is too valuable to throw away. For example, in producing the glazed slices of cheese, the molten cheese-containing mixture is flowed onto a chill roll, smoothed off with a doctor blade, lifted from the roll by a scraper, and deposited on a conveyor. During the course of this process the sheet of processed cheese is cut into ribbons and thence into slabs. From time to time a malfunction will occur and considerable of the cheese-containing mixture will be deposited on the roller and yet will not come out in the form of slabs of processed cheese.

Such a malfunction might be in the failure of the scraper to lift the sheet from the roll so that it continues on around the roll, whereupon not only that portion of the cheese fails to assume a sheet form but the cheese subsequently deposited on the roll is not formed into a sheet. There is nothing wrong with the product produced except that it is not in the desired form. If it is reheated and reflowed onto the roll it loses all or a substantial portion of the desired flavor and texture. Small portions of it can be reheated and mixed with a fresh batch, but in many cases the amount of "rework" produced is more than can be assimilated into a fresh batch. The unassimilated portions may be employed elsewhere, but normally the monetary return is substantially less.

The principal object of the present invention is to provide a method and apparatus for forming individual slabs of product such as processed cheese or the like so as to at least substantially eliminate the problem of rework and avoid cohesion when stocked. Obviously, by eliminating the loss in value and additional labor involved in handling the rework the cost of producing the product can be noticeably reduced. The method and apparatus we have devised employs a parting material between the slabs to eliminate the problem of coherence. This allows positive separation of the slabs which is not achieved by the present glazing methods, at least after the product has been stacked and permitted to stand for some period of time. Furthermore, it definitely indicates the plane at which separation of stacked slabs should be looked for by the purchaser.

Further objects and advantages of the present invention include: a machine that is ideally suited for multiple head, high speed manufacture of stacks of slabs of product; a machine that is relatively low in first cost, that requires little maintenance and that may be readily maintained by one not having highly specialized technical skills; a machine that is simple to maintain in a highly sanitary condition; and a machine that is suitable for automatic use under aseptic conditions where one is seeking to reduce or eliminate the problems involved in the keeping of the completed product.

Figure 2:
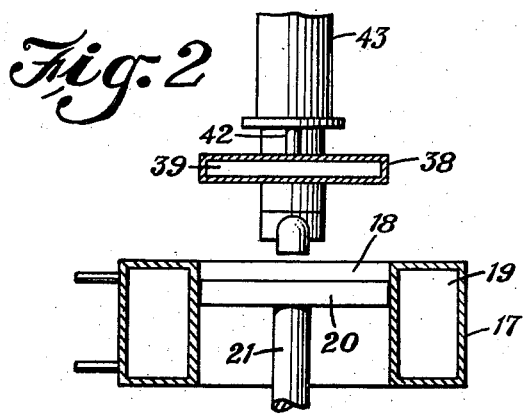

Other objects and advantages will become apparent from the following description taken in conjunction with the drawings, in which:

Figure 1 is an isometric view of a single molding head embodiment of the invention; and Figure 2 is a partial section taken at line 2—2 of Figure 1.

The method we have devised for forming a slab of product such as processed cheese or the like is first to render the cheese fluid by the application of heat. A measured amount of the fluid product is then cast in slab form and pressure is applied to opposed faces of the slab while confining the remaining edges of the slab. Preferably the casting is done on a parting material. The fluid material is then chilled to solidify it and the pressure is removed. In building up a stack of slabs this process is repeated with the initial slab first being covered by a parting material. A second slab is cast on the parting material over the first slab and in the preferred form pressure is again applied to the opposed sides of the second slab while confining the edges of the slab. This may be repeated a number of times, the number depending upon the number of slabs desired in a particular stack.

The embodiment illustrated in Figure 1 includes a frame generally 10, a mold generally 11, a fluid product feed generally 12, a parting material feed generally 13, a tamper generally 14, and power means generally 15.

Mold 11 includes a mold body 17, the structure of which is best seen in Figure 2. Body 17 has a central cavity 18 which in the illustrated embodiment is rectangular in configuration. The walls of body 17 have an inner opening 19 through which a coolant is circulated to chill the fluid product. The mold body 17 is mounted on frame 10 with the cavity opening 18 in a vertical position. A piston 20 secured to a piston rod 21 is employed to close the bottom of the mold. A pair of pipes 22 and 23 communicate with the opening 19 in the mold body and with a suitable source of coolant (not shown) to enable the coolant to be circulated through the opening 19 in the mold.

In the illustrated embodiment the parting material employed consists of sheets of parchment 24 which are stacked in a magazine 25 of the parting material feed 13. The sheets are urged upwardly in the magazine by a spring 26 and are limited in their upward movement by the overturned lips of magazine 25. The sheets 24 are individually removed from the magazine by a vacuum cup 27 supported on a rod 28. A flexible tube 29 connects vacuum cup 27 to a valve 30. Pipe 31 connects valve 30 to a suitable source of vacuum (not shown). Rod 28 rides on a cam 33 forming a part of the power means 15. The opposite end of rod 28 is attached to a block 34 which travels in ways 35 of frame 10. Block 34 is attached to one end of an arm 36 forming a part of the power means 15.

Tamper 14 includes a hollow tamping head 38 with an inner opening 39 through which a coolant is circulated through tubes 40 and 41. The tamper is adapted to slide smoothly into cavity 18 with little clearance about the sides of the head. Head 38 is secured to a piston rod 42 of a fluid cylinder 43. Fluid cylinder 43 is connected to a four-way valve 44 which controls the operation of the cylinder.

The fluid product feed 12 includes a feed pump 47 actuated by a fluid cylinder 48. The intake of pump 47 communicates with a hopper 49 by means of a pipe 50. The output of pump 47 is through a spout 51 mounted on a rotatable member 52 at the bottom end of the housing of pump 47. In a manner well known in the art the length of stroke of the pump is controllable to vary the volume of product delivered per stroke.

A lever 54 is attached to and projects from the rotatable member 52 with the opposite end of the lever being secured to the piston rod 55 of a fluid cylinder 56. A four-way valve 57 is connected to fluid cylinder 56 to control the operation thereof.

The power means 15 includes an electric motor 60 which drives a shaft 61 through a speed reducer 62 and a coupling 63. Shaft 61 is journaled in bearings 64. Shaft 61 carries two sprockets 66 and 67 respectively. Sprocket 66 is connected by a chain 68 to a sprocket 69 on a shaft 70. Shaft 70 is journaled in bearings 72. A cam 73 is attached to shaft 70 and provides the vertical movement for piston rod 21 by means of a cam follower 74 secured to the end of the piston rod. The piston rod is slidably received in vertical bearing 75.

A third shaft 77, journaled in frame 10, has mounted on it two sprockets 78 and 79 and a cam 80. Sprockets 67 and 78 are connected by a chain 81. A chain 82 connects sprocket 79 with a sprocket 83 on shaft 84. Shaft 84 is journaled in bearings 85. Shaft 84 carries cam 33 to provide the vertical movement for the vacuum cup 27.

Arm 36 is pivotally mounted on a shaft 87 supported by frame 10. A rod 88 is slidably mounted in bearing 89 with one end of the rod 88 being pinned to arm 36 and with the other end of the rod carrying a cam follower 90 which rides on the periphery of cam 80. A spring 91 has one end secured to arm 36 and the other end to a pin 92 on frame 10. Spring 91 urges the cam follower 90 against the periphery of cam 80.

Mounted on shaft 70 is a cam 95 to control the operation of four-way valve 44 and thus time the movements of tamping head 38. A cam follower 96 on actuating rod 97 of valve 44 moves the actuating rod in one direction, while the actuating rod is moved in the opposite direction by a spring 98 connecting the actuating rod 97 and frame 10. Similarly, a cam 100, cam follower 101 and spring 102 control the movements of the actuating rod 103 of valve 57. As will be seen in the drawings, cam 100 is secured to shaft 70.

Valve 30 that controls the application of the vacuum to vacuum cup 27 has a valve stem 105 on which is mounted a cam follower 106. Cam follower 106 rides against the periphery of a cam 107 and is held in that position by a spring 108.

A pusher 110 mounted on the piston rod of fluid cylinder 111 is used to remove the stack of slabs from the piston 20 when the latter is lowered from mold 11 and drawn into recess 112 in frame 10. The pusher 110 displaces the stack onto belt conveyor 113. The operation of fluid cylinder 111 is controlled by four-way valve 114 having an actuating rod 115. Mounted on the end of actuating rod 115 is a cam follower 116 which rides on the periphery of cam 117 and is held against the cam by means of a spring 118. Cam 117 is also secured to shaft 70.

A four-way valve 120 is used to control the operation of fluid cylinder 48 and thus feed pump 47. Valve 120 has a valve stem 121 carrying at its end a cam follower 122. Cam follower 122 is held in contact with the periphery of another cam 123 on shaft 70 by means of a spring 124.

In operation, hopper 49 is filled with a fluid product such as a hot processed cheese mixture. Suitable heating units, not shown, may be employed to keep the cheese mixture at the desired temperature in the hopper if that is necessary. Initially fluid cylinder 56 has turned spout 51 away from over the mold 11. Vacuum cup 27 is in contact with the top sheet of parchment in magazine 25. The rotation of cam 33 raises rod 28 and the parchment sheet is held by the vacuum cup 27 inasmuch as a vacuum is applied to the cup by the actuation of valve 30. The top sheet of parchment is pulled out from under the lips of the magazine 25. The rotation of cam 80 pushes rod 88 to the left in Figure 1, moving arm 36 to the left and bringing the vacuum cup and the sheet of parchment to a position over the open top of mold 11. Thereupon valve 30 is actuated by cam 107 so as to cut off the vacuum and allow the parchment sheet to fall into the cavity 18 in mold 11 where it comes to rest on the top of piston 20. At that point piston 20 is adjacent the top of the mold 11, having been raised to that position by cam 73.

Vacuum cup 27 is retracted from over mold 11 by the combined action of cam 80 and spring 91 and valve 57 is actuated by cam 100 so as to change the position of piston rod 55, rotating member 52, and spout 51 so that the spout is over the cavity 18 in mold 11. Thereupon, the rotation of cam 123 moves cam follower 122 to change the position of four-way valve 120 to operate fluid cylinder 48 and pump 47. This causes a measured quantity of the cheese mixture to be deposited on the parchment sheet in cavity 18. Cams 123 and 100 actuate valves 120 and 57, respectively, to change the position of the valves and move the pistons of cylinders 48 and 56, respectively. This positions the pump 47 for another charge and at the same time rotates spout 51 from over the top of cavity 18.

Valve 44 then is actuated by cam 95 to apply fluid pressure to the upper end of cylinder 43. The amount of movement of tamping head 38 is adjusted to bring the bottom of the tamping head to within a predetermined distance of the initial position of the top of piston 20, this predetermined distance being the desired thickness of the slab. The tamping head flattens out the fluid material deposited in the mold cavity 18 and causes it to fill up the sides and corners of the mold. Subsequently, cam 73 lowers piston 20 and cam 95 repositions valve 44 to raise tamping head 38, preferably in that order so that the pressure applied by the tamping head will, at least initially, force the slab down with the piston. The extent to which piston 20 is lowered by cam 73 is adjusted to be the thickness of one of the slabs of cheese so that the top of the already formed slab is in the same position as was the top of piston 20 during the start of the preceding cycle. During this period of time the cheese is chilled, both by contact with pressure head 38 and by contact with the mold body 17.

The foregoing steps in the operation are repeated for as many number of slabs as are to be produced in a given stack. When all of these slabs have been formed, cam 73 lowers piston 20 to a level comparable to the top of conveyor 113, whereupon pusher 110 is actuated by fluid cylinder 111, cam 117 having been rotated to reposition valve 114. Pusher 110 slides the stack of slabs onto the top of conveyor 113 which moves the stack to a suitable packaging station. Cam 117 immediately repositions valve 114 to withdraw pusher 110 and cam 73 raises piston 20 to its original position adjacent the top of mold cavity 18 for the start of another cycle.

The foregoing description of a specific embodiment is for the purpose of compliance with 35 U.S.C. 112, and we do not desire to be limited to the exact details shown and described, for obvious modifications will occur to a person skilled in the art.

We claim:

1. A device for forming a slab from a fluid food product such as process cheese on a parting material, said device including a mold, means to place parting material in the bottom of said mold, a metering pump to deposit a given amount of said product on said sheet of material, a tamper receivable within said mold to flow said product into slab form, chilling means to reduce the temperature of the product in the mold to solidify the product in the mold, means to remove the slab of product from the mold, and power means operatively connected to the first mentioned means, the pump, the tamper and the last mentioned means to sequentially insert parting material in the bottom of the mold, deposit a given amount of product on the sheet, tamp the product, and remove the slab from the mold.

2. A device for forming a slab from a fluid food product such as process cheese on a parting material, said device including a mold, said mold including a piston forming the bottom of the mold, said mold having an open top, means to chill said mold, means to place parting material on the bottom of the mold, means to deposit a given amount of said product on said material, tamping means receivable within the mold through the open top to flow said given amount of product into slab form, and power means operatively connected to said piston, said material placing means, said product depositing means, and said tamping means to sequentially place parting material in the bottom of the mold, deposit a given amount of product on said material, tamp said given amount of product into a slab, and displace said piston from the remainder of the mold to remove the formed slab.

3. A device for forming a slab from a fluid food product such as process cheese on a parting material, said device including a mold, said mold including a piston forming the bottom of the mold, said mold having an open top, means to chill said mold, means to place a sheet of parting material on the bottom of the mold, a metering pump to deposit a given amount of said product on said sheet of material, a tamper receivable within said mold to flow said product into slab form, power means operatively connected to said piston, said sheet placing means, said pump, and said tamper to sequentially place a sheet of material in the bottom of the mold, deposit a given amount of product on said sheet, tamp said given amount of product into a slab, and lower said piston from the remainder of the mold to remove the formed slab, and means to remove the slab from said piston after the piston is lowered from the mold.

4. A device for forming a plurality of slabs of a predetermined size from a fluid food product such as process cheese separated by sheets of a parting material, said device including a mold having a bottom and an open top, a first means to place sheets of parting material in the said mold, a second means to deposit given amounts of said product in said mold, tamping means receivable within said mold through the open top, means to chill the product in the mold, power means operatively connected to said first and second means and said tamping means to sequentially place a sheet in said mold, deposit a given amount of product on said sheet, bring said tamping means into a distance from said sheet approximately equal to the thickness of said slabs to form a slab and to repeat said slab forming operations to build up a stack of slabs in said mold, and means to remove said stack of slabs from said mold.

5. A device for forming a plurality of slabs of a predetermined size from a fluid food product such as process cheese separated by sheets of a parting material, said device including a mold having a piston forming the bottom of the mold, said mold having an open top, means to chill said mold, means to place a sheet of parting material on the bottom of the mold, a metering pump to deposit a given amount of said product on said sheet of material, a tamper receivable within said mold to flow said product into slab form, power means operatively connected to said piston, said sheet placing means, said pump, and said tamper to sequentially place a sheet of material in the bottom of the mold, deposit a given amount of product on said sheet, tamp said given amount of product into a slab, and lower said piston an amount equal to the thickness of a slab and to repeat said slab forming operations to build up a stack of slabs with the stack being positioned on said piston below the remainder of the mold when the stack is complete, and means to remove the stack from the piston.

6. The method of forming a stack of a plurality of slabs of food product such as process cheese with a parting material therebetween including the steps of heating said product to liquify the product, casting a first given amount of the liquid product in slab form, covering said slab with parting material, casting a second given amount of the liquid product in slab form on said parting material covering said slab of said first given amount, and chilling said slabs to solidify said slabs.

7. The method of forming a stack of a plurality of slabs of food product such as process cheese with a parting material therebetween including the steps of heating said product to liquefy the product, casting a given amount of the liquid product in slab form, applying pressure to opposed faces of said slab while confining the remaining edges of the slab, at least partially chilling said cast slab, removing said pressure, covering said slab with parting material, casting said amount of liquid product on said material to form a second slab, applying pressure to the opposed faces of said two slabs while confining the remaining edges of said two slabs and at least partially chilling said second slab.

8. The method of forming a stack of a plurality of slabs of food product such as process cheese with a parting material therebetween including the steps of heating said product to liquefy the product, casting a first given amount of the liquid product in slab form on said parting material, covering said slab with parting material, casting a second slab of said given amount of the liquid product on said parting material covering said slab of said first given amount, and chilling said slabs to solidify said slabs.

9. The method of forming a stack of a plurality of slabs of food product such as process cheese with a parting material therebetween including the steps of casting a given amount of the product in slab form, applying pressure to opposed faces of said slab while confining the remaining edges of the slab, removing said pressure, covering said slab with parting material, casting another said amount of product on said material covering said slab to form a second slab, and applying pressure to the opposed faces of said two slabs while confining the remaining edges of said two slabs.

10. A device for forming a slab from a food product such as process cheese on a parting material, said device including a peripheral mold having two open faces, a piston forming one of said faces, said piston being movable through a plurality of positions within said mold to a position outside said mold, means to place parting material within said mold, means to deposit a given amount of said product on said material within said mold, and tamping means receivable within said mold through said other open face to form said product into a slab.

References Cited in the file of this patent

UNITED STATES PATENTS

| | | |
|---|---|---|
| 2,018,637 | Doane | Oct. 22, 1935 |
| 2,246,016 | Sinclair | June 17, 1941 |
| 2,352,210 | Kraft | June 27, 1944 |
| 2,574,831 | Jameson et al. | Nov. 13, 1951 |
| 2,580,008 | Elsaesser | Dec. 25, 1951 |
| 2,635,965 | Hensgen et al. | Apr. 21, 1953 |
| 2,667,420 | Meulemans et al. | Jan. 26, 1954 |
| 2,784,542 | Stark | Mar. 12, 1957 |